Feb. 7, 1933.  F. BENGER  1,896,278
GASKET
Filed Dec. 23, 1929   2 Sheets-Sheet 1
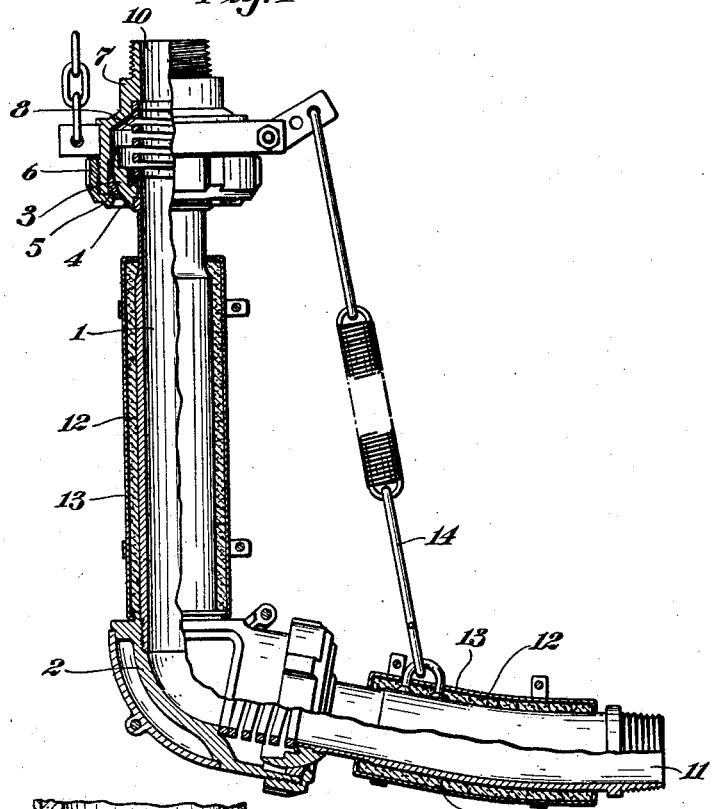
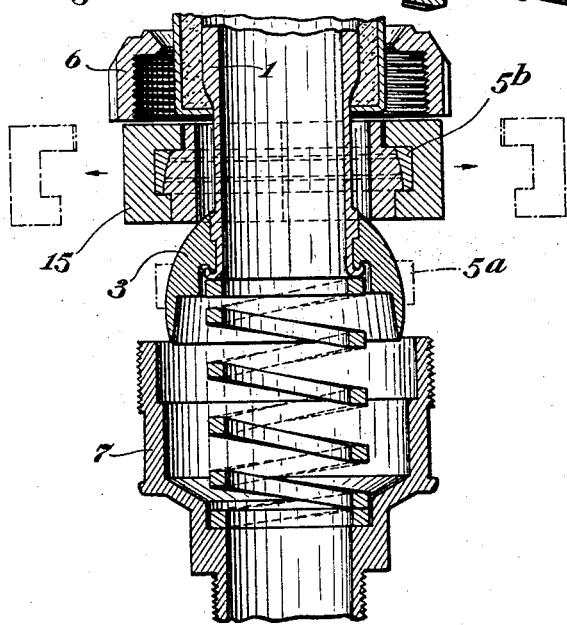
Frederick Benger
INVENTOR
BY O. V. Thiele
ATTORNEY

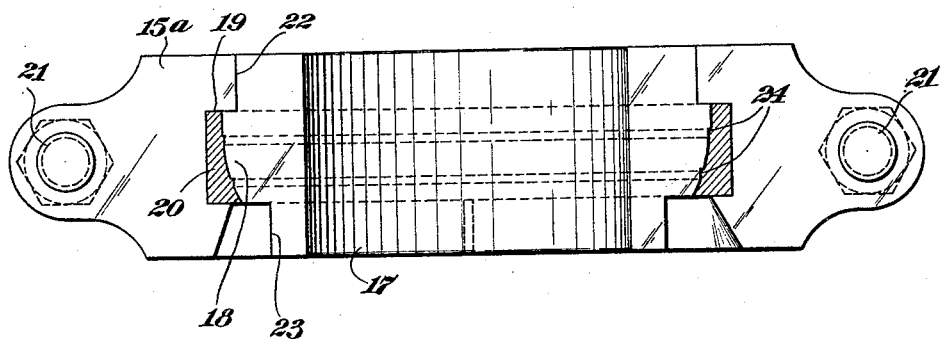
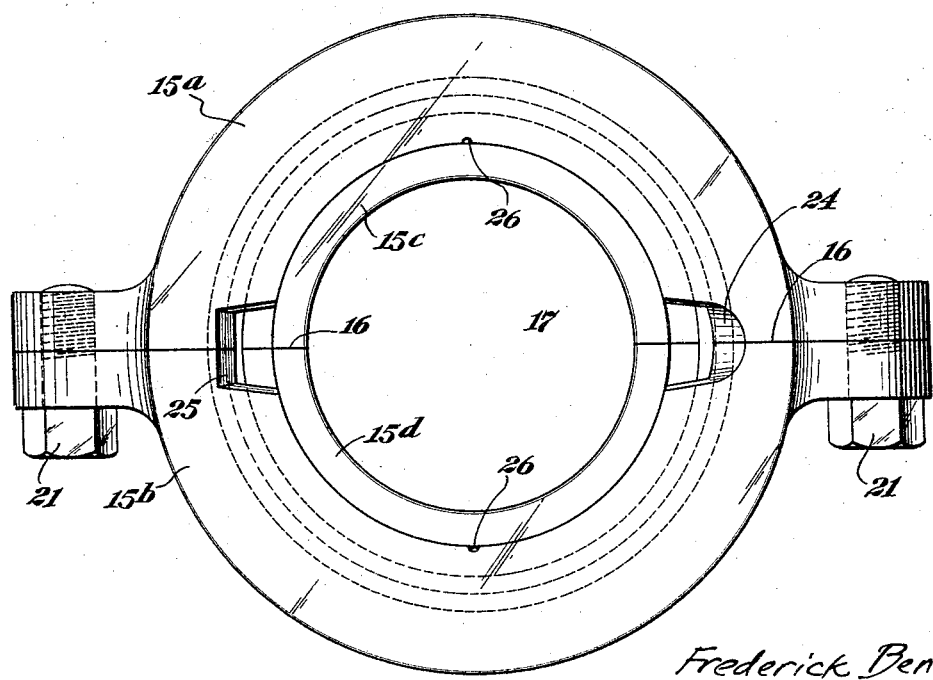

Patented Feb. 7, 1933

1,896,278

UNITED STATES PATENT OFFICE

FREDERICK BENGER, OF MONTREAL, QUEBEC, CANADA

GASKET

Application filed December 26, 1929. Serial No. 416,558.

This invention relates to gaskets and more particularly to metallic gaskets. There are conditions under which it is very inconvenient or entirely impossible to insert a new gasket when needed. Such is the case for example in connection with the so-called metallic flexible connection for the steam heating line between railway cars, in which a gasket seats against the lower side of the ball-shaped end of the pipe, that is the side facing in the direction of the pipe, and where it is very inconvenient to get at the other end of the pipe to put the gasket into place. My invention provides a means applicable in such and other cases to cast such a gasket in a position that it can readily be slipped into place. This will make the object of the invention sufficiently clear. The invention is illustrated in the accompanying drawings in connection with the one specific application just referred to. These drawings and the application represented by them are intended only as illustrative and not in any sense as limiting my invention to such use.

In Fig. 1 is shown a view partly in section of an assembly of such a metallic flexible connection according to a commercial form; Fig. 2 shows an enlarged section of a portion of the assembly of Fig. 1 with a mold as used by me in place and the gasket finished but the mold not removed. The parts shown in Fig. 2, it will be noted, are in an inverted position as compared with the corresponding parts in Fig. 1; Fig. 3 illustrates an outer half and an inner half of the molds with the gasket shown in position after casting; Fig. 4 is a top view of the mold I use.

Referring first to Fig. 1, the pipe 1 is screwed at its lower end into a fitting 2 and has at its upper end an enlarged head 3 which is fixed in what is meant to be a permanent manner to the pipe. Bearing against the spherical surface 4 of the enlarged head 3 is the gasket 5. This is pressed against the head by the nut 6 screwed on the fitting 7, the spring 8 pressing the pipe 1 and its enlarged head downward and so into firm contact with the gasket. The elbow 2 is equipped with an exactly similar spherical joint so that its interior communicates with the pipe 9. This assembly communicates at the upper end 10 with the steam supply, and at the other end 11 delivers the steam to the line leading to the heating appliances. In order to avoid radiation losses and consequent condensation of the steam, pipes 1 and 9 are lagged with insulating material 12—12 held in place by steel jackets 13—13. A spring suspension 14 holds the two portions of this line flexibly in their relative positions.

The part to which my present invention relates is the gasket 5 and the corresponding gasket in the fitting 2.

Heretofore these gaskets have been made of some composition. When such a gasket becomes leaky and has to be replaced, the assembly described above must be quite completely dismantled. First the steel jackets 13—13 have to be removed and the lagging 12—12 taken off. Next, the vertical tube 1 has to be unscrewed from the fitting 2. The screwed joint between the two is usually rusted in very tight and in order to prevent the tube 1 from collapsing under the wrench, this tube has to be made of heavier gauge material than would otherwise be required. After this, the gasket 5 can be taken off and the new one put in place and the parts reassembled.

The replacement of the gasket in fitting 2 requires similar steps.

By my invention, all or most of these tedious and expensive steps, are obviated. It becomes unnecessary to remove the jackets or the lagging or to unscrew the pipe 1 from the fitting 2.

Referring to Fig. 2, the ball-shaped head 3 will be seen in an inverted position with the pipe 1 extending upward. The nut 6 has been unscrewed from the fitting 7 and raised up out of place. 5a indicates the position which the gasket occupied which is to be replaced. The mold used by me for my invention is generally indicated at 15. 5b indicates the new gasket still in the mold.

The mold comprises four parts held together by suitable screws,—the split female mold or matrix 15, the two halves of which are indicated at 15a and 15b, and a male split mold or core shown at 15c and 15d, the line separating the two halves appearing at 16—16. The inner mold has a cylindrical interior 17 so that the two halves can be placed in position to embrace the pipe 1. On the outer surface of the male mold is an annular projecting tongue 18 extending into a corresponding groove 19 of the outer mold. Between the end of the tongue 18 and the outside of the groove 19 there is left the space 20 to be occupied by the casting.

The two halves of the outer mold are held together by screws 21—21. The inner mold engages the outer mold along the surfaces 22 and 23 so that the two halves of the inner mold are firmly held in place when the outer mold is assembled. The pouring gate for introducing the melted material for the gasket appears at 24, while at 25 is shown an opening for a riser and at 26—26 are shown air vents.

The surface of the tongue 18 which forms one of the walls of the space 20 has the shape of a spherical segment corresponding to the surface with which the gasket is to contact when in place against the ball end. Preferably I provide this mold surface with two circumferential steps or grooves 24. This will result in raised bands on the inside of the finished gasket. These bands make it easier to obtain a tight seat of the gasket against the ball end of the pipe without the necessity of exerting very great pressure.

Referring now to Fig. 2, the assembled outer and inner molds are shown in place and the gasket 5b in the place it occupies after it has been cast. It will be noted that the vertical distance required by the mold is not very great and in practice enough space is present in the standard appliances of this sort to accommodate the mold.

As soon as the metal has set, the screws 21 may be removed and the outer halves 15a and 15b taken off, as indicated in dotted lines. The gasket 5b can then be raised off the inner mold and up far enough, as viewed in Fig. 2, to make the removal of the inner mold possible after which the gasket is dropped into the position indicated at 5a. The nut 6 is then lowered into position and screwed back on to the fitting 7.

The material used for the gasket is obviously a matter of choice, the main requirement being that it be of the required degree of hardness.

The replacing of the gasket on fitting 2 is performed in exactly the same manner.

I have described in the above a mold in which the gate and riser are on the side of the gasket at which it is thickest, and it is for this reason that the inverted position of Fig. 2 is required. Obviously it would be equally feasible to make the gate and riser on the other side so that the assembly would be kept in the position of Fig. 1 during the pouring of the gasket.

In the above I have described a very specific application of my invention. Its real spirit is to provide a mold of the type described making it possible to cast a gasket in a position on a pipe where such pipe is provided with a ball end with the lower side of which the gasket is to come in contact and where such ball end is permanently fixed to the pipe and it is inconvenient or impossible to put the gasket into position by slipping it over the other end of the pipe.

I claim:

1. A mold for casting a metallic gasket around a pipe to engage a seat on the side away from the pipe end on an enlarged head permanently fixed on the pipe adjacent to the end, said mold comprising a longitudinally split matrix with a cylindrical inner surface, and a longitudinally split core with a corresponding cylindrical outer surface, one of them being provided with a circumferential groove and the other with a complementary circumferential tongue of less radial depth than the groove, the core having a longitudinal opening through it large enough to accommodate the pipe.

2. A mold for casting a metallic gasket around a pipe to engage a spherical seat on the side away from the pipe end on an enlarged head permanently fixed on the pipe adjacent to the end, said mold comprising a longitudinally split matrix with a cylindrical inner surface and a longitudinally split core with a corresponding cylindrical outer surface, the matrix being provided with an inner circumferential groove and the core with a complementary circumferential tongue of less radial depth than the groove, the outer surface of the tongue being generally spherical to the same radius as the said seat, the core having a longitudinal opening through it large enough to accommodate the pipe, and means associated with the matrix to hold the mold in assembled position.

FREDERICK BENGER.